Dec. 4, 1962  J. W. BENJAMIN  3,066,549
CONVEYOR CHAIN
Filed Oct. 24, 1960  2 Sheets-Sheet 1
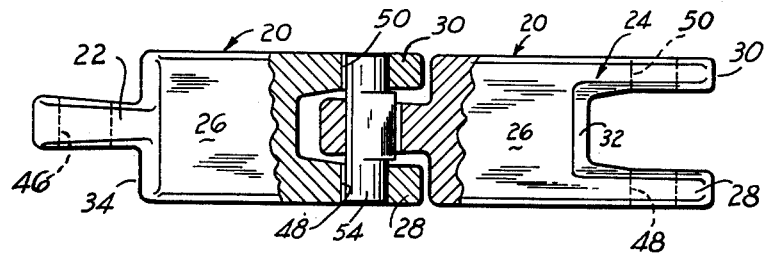
FIG. 1
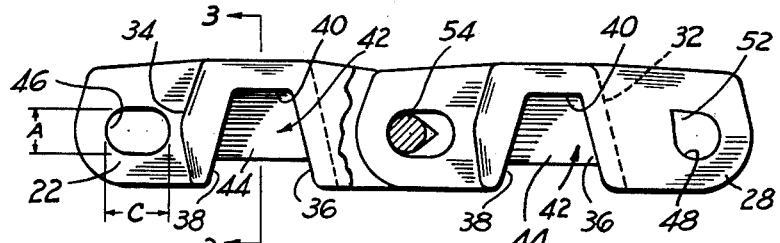
FIG. 2
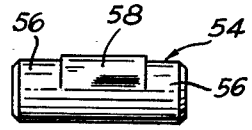
FIG. 4
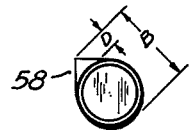
FIG. 5
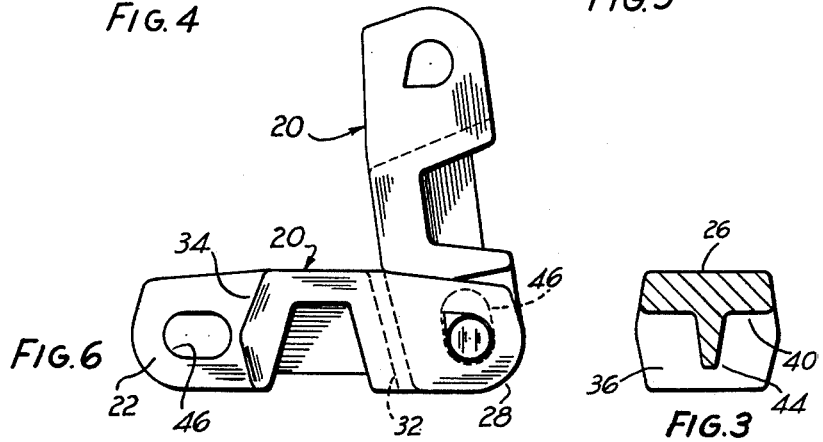
FIG. 6
FIG. 3
JOHN W. BENJAMIN - INVENTOR.
BY *James C. Hammere*
ATTORNEY Dec. 4, 1962   J. W. BENJAMIN   3,066,549
CONVEYOR CHAIN
Filed Oct. 24, 1960   2 Sheets-Sheet 2
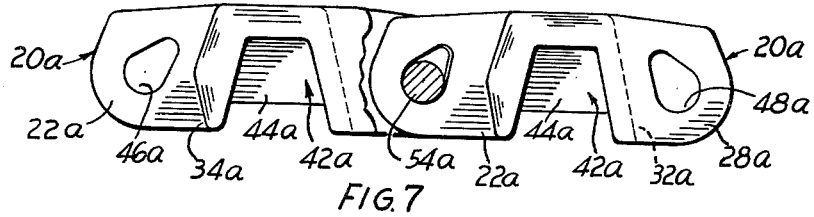
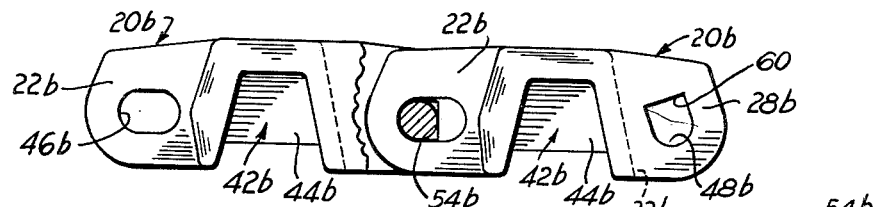
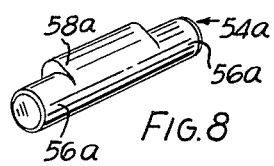
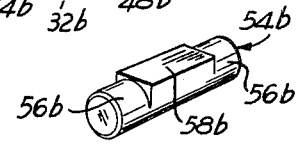
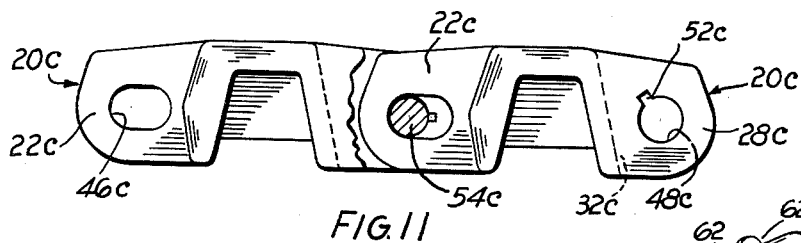
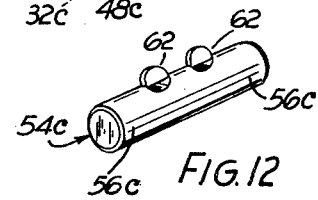
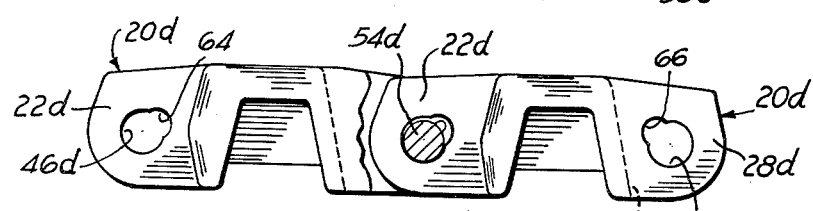
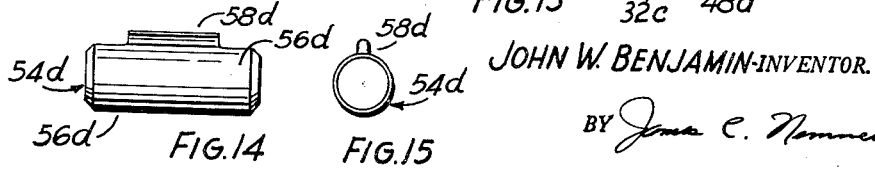
JOHN W. BENJAMIN-INVENTOR.
BY *Jenna C. Nemmers*
ATTORNEY United States Patent Office 3,066,549
Patented Dec. 4, 1962

3,066,549
CONVEYOR CHAIN
John W. Benjamin, Cedar Rapids, Iowa, assignor to Cherry-Burrell Corporation, Cedar Rapids, Iowa, a corporation of Delaware
Filed Oct. 24, 1960, Ser. No. 64,345
3 Claims. (Cl. 74—254)

This invention relates to a conveyor chain and more particularly to an improved chain structure for conveyors of the drag-chain type in which a chain running in guide channels supports and moves cartons, boxes, cases, and the like along a substantially horizontal path.

There are now on the market many different conveyors of this type that use link-and-pin chains. It is desirable that these chains have high strength and good wear properties, and a good chain also should be easily assembled or disassembled without the aid of tools, relatively maintenance free, and inexpensive to manufacture. If all of these characteristics could be built into a single chain structure, the resulting conveyor would be superior to any now commercially available.

It is therefore a principal object of my invention to provide a conveyor chain of exceptionally high strength. Since increasing the chain strength allows the number of chain drives to be reduced, this is another object of my invention.

It is a further object of my invention to provide a conveyor chain that can be quickly and easily assembled, disassembled and re-assembled by hand without the aid of tools.

It is another object of my invention to provide a conveyor chain the pins of which cannot fall out during shipping of the assembled chain nor under even abnormal operating conditions of the conveyor.

It is another object of my invention to provide a conveyor chain that can be assembled in only one way thus eliminating improper assembly resulting in accidental disassembly during use.

It is a further object of my invention to provide a conveyor chain that has excellent wear properties.

It is a still further object of my invention to provide a conveyor chain which is capable of turning on a radius considerably shorter than any chain now known.

Concurrently with the above objects of my invention, it is an object to provide a chain that can be easily and inexpensively manufactured.

These and other objects of my invention will be readily apparent from a consideration of the following description taken in connection with the accompanying drawings in which:

FIGURE 1 is a top-plan view, partially in section, of two chain links connected together;

FIGURE 2 is a side elevational view of the two chain links shown in FIGURE 1 with part of the links being broken away to show certain parts in section;

FIGURE 3 is a sectional view of the link taken on the line 3—3 of FIGURE 2;

FIGURE 4 is a view of the pin removed from the link;

FIGURE 5 is an end view of the pin;

FIGURE 6 is a side elevational view of two chain links in the proper position for either assembly or disassembly;

FIGURE 7 is a view generally similar to FIGURE 2 but showing a modified form of my invention;

FIGURE 8 is a perspective view of the pin removed from the links of FIGURE 7;

FIGURE 9 is a view generally similar to FIGURE 2 but illustrating another form of my invention;

FIGURE 10 is a perspective view of the pin removed from the links of FIGURE 9;

FIGURE 11 is a view generally similar to FIGURE 2 but illustrating a fourth embodiment of my invention;

FIGURE 12 is a perspective view of the pin removed from the links of FIGURE 11;

FIGURE 13 is a view generally similar to FIGURE 2 but illustrating a fifth embodiment of my invention;

FIGURE 14 is a side view of the pin removed from the links of FIGURE 13; and

FIGURE 15 is an end view of the pin of FIGURE 14.

Referring to FIGURES 1 and 2, chain links 20 each have a tongue portion 22 joined to a yoke portion 24 by a top connecting member 26. The yoke portion 24 consists of two parallel arms 28 and 30 that extend rearwardly from a sloped shoulder 32.

Tongue 22 extends from a front shoulder 34. The inside surfaces 36 and 38 of shoulders 32 and 34, respectively, and the bottom surface 40 of member 26 form a recess 42 that is necessary to allow engagement of the link 20 with the teeth of a drive sprocket (not shown). A bridge member 44 extends longitudinally through the center of recess 42 to add strength to the link 20. The shoulders 32 and 34 are sloped as shown for a purpose that will be explained later.

Formed in the tongue 22 of each link 20 is a longitudinally elongate opening 46, and formed in arms 28 and 30 are openings 48 and 50, respectively, each of which is partially circular in shape. At least one of the openings 48 or 50 must have a triangular shaped cut out portion 52 that makes the opening somewhat tear-shaped. Of course, both openings 48 and 50 may be made with a cut out portion 52, and this may be desirable from a manufacturing standpoint. As shown, triangular portion 52 preferably is formed on the side of the opening 48 closest to the shoulder 32 and its peak preferably points upward at an angle of about 30° from the horizontal. In this way, addition of the portion 52 does not adversely affect the strength of the link 20.

The links 20 are inter-connected by pins 54 that are generally cylindrical in shape. Each pin 54 has circular-shaped ends 56 and an intermediate portion 58 the cross-section of which corresponds to the shape of opening 48 and is uniform throughout. The diameter of the circular-shaped ends 56 of the pin 54 should be slightly less than the dimension A (FIGURE 2) of the opening 46 in tongue 22. Also, the diameter of ends 56 should be slightly less than the diameter of openings 48 and 50 so that the pin may be easily inserted. However, the longest dimension of the cross-section of intermediate portions 58, indicated by the dimension B in FIGURE 5, should be greater than the dimension A, the shorter dimension of opening 46, but less than the longer diameter C.

Pins 54 preferably are machined from cold-rolled bar stock, and can be mass produced on a screw machine. The links 20 preferably are forged and their design is such that they can be easily forged. We prefer to make these components by these processes since they will yield a chain of maximum strength. Chains of a design limiting the method of manufacture of the links to casting and the pins to forging, cannot attain a comparable strength without increasing the size of the chain.

Referring now to FIGURE 6, two links 20 are shown in position to be either coupled or uncoupled. By viewing the links 20 in this position, the reasons for sloping the shoulders 32 and 34 become more obvious. Sloping permits the links 20 to be positioned at an acute angle between their top members 26. When the links 20 are in this position, the longer diameter C of the tongue opening 46 is in alignment with the longest dimension B of opening 48 to permit the pin 54 to be easily inserted through the opening 48 in arm 28, through the tongue opening 46, and through the opening 50 in arm 30 thereby coupling two links together. Uncoupling is also done with two links 20 in the relative position shown in FIGURE 6. Note that in coupling the links, the peak of intermediate portion 58 of the pin 54 is inserted facing to the rear of the tongue 22. Thus, when the links 10 are returned to their normal operating position, such as shown in FIGURE 1, the pin 54 will rotate with the link 20 and the peak 58 of pin 54 will continue to point to the rear. Rotation of the pin 54 in tongue opening 46 is limited because dimension B of pin 54 is greater than dimension A of the tongue opening 46. Thus, the pin 54 cannot fall out or be removed, and the links 20 thereby uncoupled, unless the links 20 are moved to the relative position shown in FIGURE 6. It is virtually impossible for the links to get into this uncoupling position during even abnormal operation of the conveyor.

The addition of portion 58 to pin 54, of course, adds strength to the pin which is often the weakest part of a chain.

My novel conveyor chain has excellent wear properties since wear is distributed to three places: (1) and (2) between the ends 56 of the pin 54 and the arms 28 and 30 of the link 20; and (3) between the center of pin 54 and tongue 22. Note that as the pin "wears in," the diameter of ends 56 of the pin 54 will become smaller, and since there is no wear on the peak of the intermediate portion 58, the dimension D (FIGURE 5) will gradually increase further lessening the possibility of the pin 54 accidentally coming out. This "wearing in" does not affect in the slightest the ease with which the pin 54 can be removed when the links 20 are in the proper relative position for disassembly shown in FIGURE 6.

Also inherent in my novel chain design, is its short turning radius. There is a large difference between the thickness of the tongue 22 and the space between the arms 28 and 30. Also, dimension C of opening 46 is greater than dimension B of pin 54. Thus, when the chain travels around a lateral curve, the links 20 can easily move laterally relative to one another. The relative lateral movement between the links 20 in this embodiment of my novel chain is considerably greater than any chain of the prior art and permits the chain to traverse a lateral curve of almost half the radius of prior art chains.

Referring now to FIGURES 7 and 8, a modified form of my invention will be described. Parts corresponding to those of the first embodiment will be referred to by the same reference numerals with the addition of the subscript a. The links 20a of the second embodiment of my chain are very similar to the links 20 of FIGURES 1 and 2. The links 20a have a tongue 22a and rearwardly extending arms 28a and 30a (not shown). Tongue 22a has an opening 26a. The opening 26a however differs from the opening 26 of the first embodiment in that the opening 26a is somewhat tear-drop shaped with the peak of the tear drop pointing upward and toward the rear of the chain link. Arms 28a and 30a have holes 48a and 50a respectively that are identical in shape to the opening 26a. However the openings 48a and 50a point upward and toward the front of the chain link 20a.

Links 20a are identical to the links 20 of the first embodiment and have sloping shoulders 32a and 34a. Links 20a are also provided with a recess 42a through the center of which extends a bridge member 44a. The pin 54a as shown in FIGURE 8 has circular ends 56a and an intermediate portion 58a the cross sectional shape of which is the same as that of the openings 26a, 48a and 50a. The cross section of the intermediate portion 58a is uniform throughout.

Two of the links 20a can be connected when the identically shaped openings 26a, 48a and 50a are in alignment. These openings will be in alignment when two of the links 20a are in the same relative position as the two links shown in FIGURES 6 of the first embodiment, that is, with the top surface of the tongue 22a lying along the shoulder 32a between the two arms 48a. When the links 20a are rotated back to a position in a straight line, it will be virtually impossible for the pin 54a to fall out accidentally.

A chain composed of links 20a of my second embodiment has one advantage over the chain of my first embodiment in that it is impossible to couple two links 20a together with the pin 54a in the wrong position. In other words, there is only one way the pin can be inserted. In a chain composed of links 20, it is possible to insert the pin 54 backwards, with the peak of intermediate portion 58 pointing to the front of the chain. However, both the links 20a and the pins 54a are a little more difficult to manufacture than those of the first embodiment and a chain composed of links 20a will not transverse a lateral curve as sharp as the chain of the first embodiment.

Referring now to FIGURES 9 and 10, another form of my invention will be described. Parts corresponding to those of the first embodiments will be referred to by the same reference numerals with the addition of the subscript b. The links 20b of this third embodiment of my chain are almost identical to the links 20 of the first embodiment and have a tongue 22b and rearwardly extending arms 28b and 30b (not shown). Tongue 22b has a longitudinally elongated opening 46b, and the arms 28b and 30b are provided with holes 48b and 50b respectively. Either one or both of the holes 48b or 50b must be provided with a peaked portion 52b pointing up and toward the front of the link 20b. However, in this embodiment I provide another peaked portion 60 identical to portion 52b but extending upward and slightly to the rear of the link 20b. The portions 52b and 60 make the upper half of opening 48b rectangular while the lower half is circular.

The pin 54b of the third embodiment is similar to pin 54 in that it has circular ends 56b and an enlarged intermediate portion 58b. The cross-section of the enlarged intermediate portion 58b corresponds to the shape of opening 48b. As in the first embodiment, the relative dimensions of the tongue opening 46b and the pin 54b are such that once the pin 54b is inserted through the opening 46b, its rotational movement will be limited, the thickest portion of the pin 54b being greater than the shorter diameter of the opening 46b. In all other respects this embodiment is structurally similar to the first embodiment shown in FIGURES 1 through 6. The chain is assembled and disassembled with the links 20b in the same relative position as links shown in FIGURE 6. Similar to the chain of the second embodiment, the chain of FIGURE 9 has one advantage over the chain shown in FIGURES 1 through 6, in that it is impossible to couple two links with the pin 54b in the wrong position. In the chain of FIGURES 1 through 6, it is possible to insert the pin 54 backwards, with the peak of intermediate portion 58 pointing to the front of the chain. This fool-proof feature of the third embodiment is made possible by the addition of portion 60 to the hole 48b. However, portion 60 slightly decreases the strength of the chain and lessens the lateral flexibility of the chain.

Referring now to FIGURES 11 and 12, the fourth embodiment will be described with parts corresponding to these of the first and second embodiments being referred to by the same reference numeral with the addition of the subscript c. The link 20c is substantially identical to the links 20 and 20b of the first and third embodiments and is comprised of a tongue 22c and two rearwardly extending arms 28c and 30c. The tongue portion 22c has a longitudinally elongated opening 46c and the arms 28c and 30c have openings 48c and 50c, respectively. This embodiment differs from the first and third embodiments in that the openings 48c and 50c in arms 28c and 30c are substantially circular in shape but have a small rectangular shaped cut-out portion 52c extending upward and toward the front of link 20c.

The pin 54c has circular ends 56c but in this embodiment the intermediate portion of the pin 54c has two projecting ears 62 that are formed by "pinching" round bar stock and thereby displacing some of the metal. A chain made according to the teachings of this fourth embodiment has all the advantages of one made according to the first embodiment of FIGURES 1 through 6 except that it is not quite as strong. However, where the chain manufacturer would prefer to forge the pins rather than machine them, the fourth embodiment shows how this can be done without losing the advantages of my invention.

In FIGURES 13, 14, and 15 the fifth and last embodiment of my invention is shown with parts corresponding to those of the other embodiments being referred to by using the same reference numeral followed by the subscript d. The opening 46d in the tongue 22d of link 20d is somewhat different than that of the previous openings of the other embodiments. The opening 46d is formed by drilling two circular holes of different diameters on different centers. Thus the opening 46d is circular but has cut-out, on the side facing slightly upward and to the rear, an arcuate portion 64. The rearwardly extending arm 28d has a similarly shaped opening 48d that has an arcuate cut-out portion 66. However, portion 66 of opening 48d is on the side of opening 48d slightly upward and facing the front of link 20d. The angles formed by lines drawn through the centers of the circular portions forming the openings 46d and 48d are such that when two links 20d are in the relative positions shown in FIGURE 6, the openings 46d and 48d will be in alignment to allow easy insertion of the pin 54d.

Pin 54d has circular-shaped ends 56d and an intermediate portion 58d of uniform cross section. As seen in FIGURE 15, this intermediate portion 58d is a relatively narrow cross section.

A chain formed from links 20d although slightly weaker than a chain formed from links 20 of the first embodiment which is the strongest of all the embodiments, has all the advantages of the other embodiments including the advantage that it is impossible to assemble the chain improperly. A chain formed from links 20d combines adequate strength with fool-proof, easy assembly and ease of manufacture to give a chain that is highly satisfactory in many respects.

It is apparent from the above description that I have invented a conveyor chain of exceedingly high strength. A chain constructed according to my first embodiment, FIGURES 1 through 6, has been proven by test to have an ultimate strength over 40,000 lbs. The other embodiments of my invention do not provide quite as strong a chain, but their strength is still relatively high. I attribute this high strength to the design of the pins and proper design and placement of the openings in the tongue and arms. In addition, some of the strength results because the links can be forged and need no be cast. Also, because of the design of the pins most of them can be machined from cold-rolled bar stock thereby giving the pins an inherent strength greater than pins that because of design must be either forged or cast. The high strength of my novel chain allows longer sections of the chain to be used. In other words, the number of drives for a given conveyor installation is reduced thus effecting a cost saving.

With this superior strength I have combined ease of assembly and disassembly in all the embodiments. Superior wear properties are inherent in all my chains because of distribution of the wear to three places whereas in other known designs the wear takes place in only two places and sometimes one. By use of the proper mass production methods, this chain can be competitive in cost with those chains that are made by less expensive methods. Because of this novel combination of features into a single chain, this chain is believed to be superior to any chain in the prior art.

Having thus described my invention, it will be apparent to those skilled in the art that some modifications and revisions may be made in the design of my chain without departing from the spirit and scope of the invention thereof. It is my intention, however, that any such revisions or modifications be included within the scope of my invention which is to be determined by the following claims.

I claim:

1. A conveyor chain comprising, links each having a yoke and a tongue provided with an opening, said yoke including a shoulder transversely of said tongue with a pair of parallel spaced-apart arms extending rearwardly from the shoulder, said arms having aligned openings and being spaced apart a distance somewhat greater than the width of said tongue, pins adaptable to be positioned in the openings of said arms and tongue to connect said links, said pins each having cylindrical-shaped end portions joined by a center portion of uniform cross-sectional shape which is substantially circular with a relatively small projection extending therefrom, each of said pins being passable through the openings in said tongue and arms separately, and the openings in said arms and tongue being formed by two overlapping circular holes and relatively positioned so that the pin can be passed through all the openings simultaneously only when the tongue of one link is positioned between the arms of a second link with the top edge of the tongue of the first link positioned along the shoulder of said second link.

2. A conveyor chain comprising, forged links each having a yoke and a tongue provided with a longitudinally elongated hole, the yoke including a pair of parallel arms having aligned openings of generally circular shape, said arms being spaced-apart a distance somewhat greater than the width of said tongue and extending oppositely to said tongue, the opening in at least one of said arms having an enlarged portion that is triangular in shape with the apex of the triangle directed generally toward said tongue, and pins adapted to be positioned in the openings in said arms when aligned with the hole in said tongue to connect said links, said pins have substantially cylindrical-shaped end portions joined by a center portion of uniform cross-sectional shape complimentary to the shape of the enlarged opening in the arm of said yoke.

3. The conveyor chain of claim 2 in which the enlarged opening in the arm has a second enlarged portion that is also triangular in shape with the apex of the triangle directed substantially 90° rearwardly from the apex of the first triangular-shaped portion.

References Cited in the file of this patent

UNITED STATES PATENTS

| | | |
|---|---|---|
| 302,574 | Ludlow | July 29, 1884 |
| 377,572 | Mey | Feb. 7, 1888 |
| 1,608,340 | Scheidy | Nov. 23, 1926 |
| 2,000,499 | Roland | May 7, 1935 |
| 2,365,866 | Dalrymple | Dec. 26, 1944 |
| 2,619,843 | Kampfer | Dec. 2, 1952 |
| 2,696,742 | Otto | Dec. 14, 1954 |

UNITED STATES PATENT OFFICE
CERTIFICATE OF CORRECTION

Patent No. 3,066,549                             December 4, 1962

John W. Benjamin

It is hereby certified that error appears in the above numbered patent requiring correction and that the said Letters Patent should read as corrected below.

Column 2, line 23, for "elongate" read -- elongated --; line 46, for "portions" read -- portion --; column 3, line 2, for "10" read -- 20 --; lines 49, both occurrences, 51, 55, 63 and 67, for "26a", each occurrence, read -- 46a --; column 3, line 50, for "26" read -- 46 --; line 72, for "48a" read -- 28a --; column 5, line 31, after "is" insert -- of --; line 52, for "no" read -- not --.

Signed and sealed this 28th day of May 1963.

(SEAL)
Attest:

ERNEST W. SWIDER                                     DAVID L. LADD

Attesting Officer                                        Commissioner of Patents